United States Patent Office 3,232,875
Patented Feb. 1, 1966

3,232,875
SILICONE LUBRICANTS CONTAINING COTELO-
MERIC LOAD CARRYING ADDITIVES
David W. Young, Homewood, Daniel B. Eickemeyer, Park
Forest, and Elwin B. Ovist, Olympia Fields, Ill., as-
signors, by mesne assignments, to Sinclair Research,
Inc., New York, N.Y., a corporation of Delaware
No Drawing. Filed June 22, 1961, Ser. No. 118,783
6 Claims. (Cl. 252—49.6)

The present invention relates to silicone base lubricant compositions of improved load-carrying capacity.

Many lubricant applications require fluids or greases with high temperature stability and low temperature fluidity. Silicone fluids and greases have been developed which possess this combination of desirable properties. These products, however, are relatively useless as high pressure lubricants due to their lack of sufficient load carrying capacity and thus are unsuitable as lubricants, for instance, in applications involving a high rubbing speed between lubricated surfaces, particularly ferrous surfaces. As a consequence, the silicones permit excessive wear.

It has now been found that a silicone base lubricant can be provided with high load carrying properties by incorporating therein a minor effective amount of a liquid polymer of (A) A per(fluorochloro)ethene such as trifluorochloroethylene and difluorodichloroethylene;
(B) Vinylidene fluoride; and
(C) A halogenated ethane compound having the structural formula:

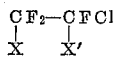

wherein X and X' are halogen atoms, i.e. fluorine, chlorine, bromine and iodine, X being preferably chlorine or bromine and X' preferably bromine or iodine. The polymer is a liquid of lubricating viscosity and often has an average molecular weight of about 400 to 5000 or more, preferably about 500 to 1500. The polymer generally distills primarily in the range of about 100 to 300° C. or more at 1 mm. Hg, and may have a kinematic viscosity at 100° F. of about 20 to 1500 centistokes. The polymer may be used as such or distilled to select more desirable fractions. It should be emphasized that employment of the vinylidene fluoride monomer is important to the production of the polymer of the present invention, otherwise a stable fluid of sufficient high heat stability and liquid range is not obtained. Moreover, it is important that all three components be used in order to obtain the polymer of the present invention. Polymerization, for example, of vinylidene fluoride with but one of the other two components will not provide a polymer of the desired properties. Whether the thermal cotelomerization or the radiation cotelomerization method is employed the molar ratio of the halogenated ethane compound:per(fluorochloro)ethene:vinylidene fluoride utilized as generally about 1:about 1.5 to 5 or 10:about 0.75 to 3 or 6.

Although methods known to the art may be employed in preparing the polymers of the present invention the preferred methods are by what we may term thermal cotelomerization or radiation co-telomerization.

In thermal cotelomerization the 3 components of the present invention are heated at a temperature of about 100 to 300° C., preferably about 175 to 225° C., for a time sufficient to complete the reaction. Ordinarily the reaction period is about 12 to 24 or more hours. Unreacted materials and by-products are then distilled off and the polymer recovered.

If desired, the copolymer may be further treated with halogen, preferably fluorine, in the presence of an inert gas such as nitrogen. This latter treatment ordinarily is conducted employing a stream of about 1 to 20 moles of inert gas, preferably about 5 to 15 moles to about 1 mole of halogen, at a temperature of about 70 to 100° C. The treatment usually is continued for about 8 to 36 hours or until the fluorine content of polymer is increased, e.g., about 5 to 20% based on total polymers.

The radiation cotelomerization method involves subjecting a mixture of the three components of the present invention to ultra-violet radiation, as for example, the radiation supplied by a 100 to 500 watt water cooled mercury vapor lamp. Preferably the radiation is conducted by first irradiating component C, i.e. the halogenated compound having the structural formula:

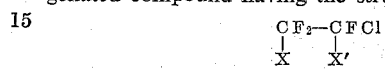

for a short period, usually about 0.5 to 1 hour, then adding the other two components and continuing the irradiation to complete the polymerization. Unreacted material and by-products are then separated and the polymer recovered. Although the polymer may be used as is, it is preferred to distill off the lower-boiling material up to about 180° C. at 1 mm. of Hg pressure and to employ the 180°+ C. material or fractions thereof.

The silicone oils of lubricating viscosity which may be used in the compositions of the present invention are the liquid organic siloxane polymers in which the siloxane structure, —Si—O—Si—, occurs successively along the polymer chain and in which the major number of residual valences of the silicone atoms are satisfied by the substitution thereon of monovalent organic essentially hydrocarbon radicals such as aromatic and aliphatic radicals. For the purpose for which such silicone oils are used in the present invention, the aliphatic substituents of the polymers are preferably low molecular weight alkyl radicals (i.e. those having not more than about 5 carbon atoms per radical) such as methyl, ethyl and butyl radicals, and the aromatic substituents are preferably phenyl, halogen substituted phenyl radicals, and alkyl substituted phenyl radicals in which the alkyl group is halogenated. The aromatic siloxane polymers are preferably those in which a major proportion of the silicon atoms are bonded to aliphatic radicals such as methyl radicals, and in which the remaining number of organic radicals are aromatic radicals. Typical examples of specific silicone oils which may be used are the dimethyl siloxane polymers having a viscosity of at least 10 centistokes at 25° C. (77° F.) and preferably a viscosity of at least 20 centistokes at 25° C. Such methyl substituted siloxanes are commercially known as the Dow Corning Silicone Type 200 fluids and are mixtures of polymers of the homologous series of trimethyl end-blocked dimethyl siloxane polymers having a viscosity at 25° C. ranging up to about 12,500 centistokes. Other suitable siloxane polymers which may be used in accordance with the present invention are the aliphatic and aromatic substituted siloxane polymers such as the methyl phenyl siloxane polymers of medium aromaticity commercially available as Dow Corning DC–550 silicone oil, and those containing a low ratio of phenyl to methyl groups commercially available as Dow Corning DC–510 silicone oils. Further examples of suitable aliphatic and aromatic substituted siloxane polymers are the methyl phenyl siloxanes in which the phenyl radical is substituted with halogen such as in methyl-p-bromophenyl siloxane polymer, methyl p-chlorophenyl siloxane polymer, methyl m-trifluoromethyl phenyl siloxane polymer and methyl 3,4-dichlorophenyl siloxane polymer. It is within the scope of the present invention to employ any admixture of the above-mentioned silicone oils as an ingredient of the presently described novel compositions.

It is to be understood that by the term "siloxane polymer" as used herein includes silicone oils having the following general formula:

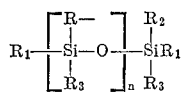

wherein $R_1$, $R_2$ and $R_3$ are the same or different hydrocarbon radical such as a straight or branched chain alkyl, aryl, alkaryl, arylalkyl, halogen-substituted aryl or halogen-containing alkyl substituted aryl radicals and $n$ is an integer of at least 2. Such silicones are also referred to in the literature as organo polysiloxanes.

The preparation of the silicone fluids which are used is well-known to those skilled in the art. In general they are prepared by the hydrolysis of hydrolyzable organosilanes, followed by complete or partial condensation of the hydrolysis products. For example, hydrolysis of dimethyl dichlorosilane followed by condensation of the resultant product of hydrolysis yields methyl siloxane polymers similar to those of the Dow Corning DC–200 silicone fluids above-mentioned. As a further illustration of the method for the preparation of the polysiloxanes which may be employed, p-chlorophenyl methyl diethoxy silane is hydrolyzed in an acid medium. The hydrolysis product thereby obtained is then condensed under reduced pressure with the hydrolysis product of hexamethyl disiloxane at a temperature of about 120° C. for several hours to yield methyl p-chlorophenyl siloxane polymer.

The particular concentration of the copolymer of the present invention employed may depend on the properties of the particular copolymer fraction and silicone fluid selected and on the desired characteristics of the resultant lubricating composition. In any event, the amount incorporated will be that sufficient to improve the load-carrying capacity of the final composition. In general, the amount of the copolymer employed is about 1 to 40 weight percent, preferably about 5 to 15 weight percent.

To obtain silicone grease compositions, a thickening or gelling agent may be added to the copolymer-containing silicone fluids. The thickening agents which may be employed include, for example, metal salts or soaps of organic acids, for example the alkaline metals, i.e. alkali and alkaline earth metal soaps of fatty acids, usually of 8 to 20 carbon atoms; preferably, metal salts of organic perfluoro-carboxylic acids, siliceous materials such as bentonites and esterils and aryl substituted ureas. The amount of gelling agent employed will depend to some extent on the copolymer fraction and its amount and the particular silicone fluids employed. In any case, it will be an amount sufficient to thicken the fluid to grease consistency and will generally fall within a range of about 3 to 30 weight percent. Generally less thickener is used with higher molecular weight copolymers and more viscous silicones than with the lower molecular weight copolymers and less viscous silicones. The selection of the proper composition is determined by the particular end use of the grease.

Other addities may be incorporated in the compositions of the present invention to improve other characteristics as long as they do not unduly deleteriously affect the composition. For example, the composition may include other extreme pressure agents, corrosion inhibitors, anti-foam agents, viscosity index improvers, etc.

The following examples are included to further illustrate the present invention.

EXAMPLE I

A 300 cc. bomb was charged with 80 g. (.287 mole) (1.6 parts by weight) of $CF_2ClCFClI$, 150 g. (1.285 moles) (3 parts by weight) of $CF_2=CFCl$ and 50 grams (0.782 mole) (1 part by weight) of $CF_2=CH_2$ and heated at 200° C. for 18 hours. Unreacted material and by-products were separated at 60° C. and 1 mm. Hg. The residue was fractionated at 1 mm. Hg to give two cuts designated I and II. Cut I had a boiling range of 100 to 180° C. at 1 mm. Hg, a K.V. at 100° F. of 23.21 centistokes (cs.) and Cut II had a boiling range of 180 to 280° C. at 1 mm. Hg and a K.V. at 100° F. of 1232.5 cs.

In a similar preparation the residue was treated with a stream of nitrogen (0.9 mole/hr.) and fluorine (0.1 mole/hr.) for 12 hours at 90° C. The resulting product was distilled to give a 25% fraction distilling at 180 to 240° C. at mm. Hg and a higher boiling residue designated as Cut V. 10 weight percent portions of Cuts I, II and V were separately blended with silicone fluids and the blends subjected to the Shell Four Ball Wear Test. The results are shown in Table I below.

EXAMPLE II 1500 g. (5.43 moles) of $CF_2BrCFClBr$ were placed in a quartz reactor, thermostated at 60° C. and irradiated with a 450 watt Hanovia mercury-vapor lamp. A mixture of about 11 moles $CF_2=CFCl$ and about 5.5 moles $CF_2=CH_2$ was passed into the flask. After 24 hours reaction time, the material was removed from the reactor and distilled up to 180' C. at 1 mm. Hg. A 7 to 10% yield of residue having a boiling point above 180° C. was obtained and designated Cut IV. A portion of Cut IV was distilled to obtain a fraction having a boiling range of 190–230° C. at 1 mm. Hg. This fraction was dsignated Cut III. 10 weight percent of Cut III and IV were also separately blended with silicone fluids and the blends subjected to the Shell Four Ball Wear Test. The results are also shown in Table I below. In the Shell Four Ball Wear Tests a tester is employed consisting essentially of three contacting steel balls held in fixed position relative to each other and a fourth ball above and in contact with the other three. The fourth ball is pressed against the three stationary balls at an adjustable speed and rotated at a constant speed. The points of contact are lubricated. During a test, circular scars are worn in the surface of the three stationary balls. The diameter of the scars is a measure of the wear.

Table I

| Test conditions | Silicone | Polymer | Wt. percent polymer in blend | Average diameter of wear scar (mm.) |
|---|---|---|---|---|
| Room temp., 40 kg. load, 1,200 r.p.m., 1 hr. | A [1] | None | | 1.66 |
| | A | I [2] | 10 | 0.89 |
| | A | II [3] | 10 | 0.79 |
| | B [4] | None | | 1.96 |
| | B | III [5] | 10 | 1.44 |
| | B | I | 10 | 0.70 |
| | C [6] | None | | 1.66 |
| | C | IV [7] | 10 | 1.08 |
| Room temp., 6 kg. load, 1,200 r.p.m., 5 hrs. | B | None | | 1.23 |
| | B | III | 10 | 0.40 |
| | C | None | | 0.60 |
| | C | IV | 10 | 0.42 |
| Room temp., 40 kg. load, 640 r.p.m., 1 hr. | D [8] | None | | 1.82 |
| | D | V [9] | 10 | 1.85 |
| | D | IV | 10 | 0.90 |
| Room temp., 6 kg. load, 640 r.p.m., 5 hrs. | D | None | | 1.42 |
| | D | V | 10 | 1.31 |
| | D | IV | 10 | 1.10 |
| 300° F., 6 kg. load, 640 r.p.m., 5 hrs. | D | None | | 1.20 |
| | D | V | 10 | 1.03 |
| | D | IV | 10 | 0.72 |

[1] A methyl silicone. K.V. at 100° F.: 65.96 cs.
[2] Thermal cotelomer. Distilled at 100–180° C. at 1 mm. K.V. at 100° F.: 23.21 cs. Solubility in silicone "A" less than 10%. An emulsion used in this test.
[3] Thermal cotelomer. Distilled at 180–280° C. at 1 mm. K.V. at 100° F.: 1232.5 cs. Solubility in silicone "A" less than 10%. An emulsion used in this test.
[4] A methyl phenyl silicone. K.V. at 100° F.: 28.18 cs.
[5] Radiation on cotelomer. Distilled at 190–230° C. at 2 mm. K.V. at 100° F.: 370.0 cs.
[6] A methyl phenyl silicone. K.V. at 100° F.: 57.7 cs.
[7] Radiation cotelomer. Boiling point: >180° C. at 1 mm. K.V. at 100° F.: 447.9 cs.
[8] Silicone ball bearing grease.
[9] Thermal cotelomer. Boiling point: >240° C. at 1 mm.

Examination of the data clearly shows the advantageous effects the polymer additives of the present invention have in improving the load-carrying capacity of silicone base lubricant compositions.

We claim:
1. A lubricant composition consisting essentially of a major amount of an oleaginous silicone base oil and a minor amount of a polymer prepared from the polymerization of a halogenated ethane compound having the structural formula:

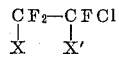

wherein X and X' are halogen atoms, perfluorochloroethene and vinylidene fluoride in a molar ratio of about 1:about 1.5 to 10:about 0.75 to 6, said polymer being a liquid of lubricating viscosity, the amount of said polymer being sufficient to provide the oleaginous silicone base oil with improved load carrying capacity.

2. The composition of claim 1 wherein the perfluorochloroethene is trifluorochloroethylene and the halogenated ethane compound is $CF_2ClCFClI$.

3. The composition of claim 2 wherein the halogenated ethane compound is $CF_2BrCFClBr$.

4. The composition of claim 1 wherein the polymer is a liquid distilling in the range of about 100 to 300° C. at 1 mm. Hg.

5. The composition of claim 1 wherein the amount of polymer is about 1 to 40 weight percent and sufficient to improve the load-carrying capacity of the base oil.

6. The composition of claim 1 wherein the amount of polymer is about 5 to 15 weight percent and sufficient to improve the load-carrying capacity of the base oil.

References Cited by the Examiner

UNITED STATES PATENTS

| | | | |
|---|---|---|---|
| 2,856,440 | 10/1958 | Wolff | 252—58 X |
| 2,875,253 | 2/1959 | Barnhart | 260—653.1 X |
| 2,886,607 | 5/1959 | Wade et al. | 260—653.1 X |
| 2,927,893 | 3/1960 | Neunherz | 252—49.6 |
| 3,091,648 | 5/1963 | Hauptschein et al. | 260—653.1 |

FOREIGN PATENTS 824,229  11/1959  Great Britain.

DANIEL E. WYMAN, *Primary Examiner.*
JULIUS GREENWALD, *Examiner.*